(12) United States Patent
Driskell

(10) Patent No.: US 10,889,485 B2
(45) Date of Patent: Jan. 12, 2021

(54) DISPENSING SYSTEM INCLUDING A DISPENSING TAP AND AN INTEGRATED MEASURING CAP/CUP AND HOLDER

(71) Applicant: Silgan Dispensing Systems Corporation, Grandview, MO (US)

(72) Inventor: William L. Driskell, Grandview, MO (US)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 16/593,982

(22) Filed: Oct. 5, 2019

(65) Prior Publication Data

US 2020/0115214 A1 Apr. 16, 2020

Related U.S. Application Data

(60) Provisional application No. 62/746,109, filed on Oct. 16, 2018.

(51) Int. Cl.
*B67D 3/00* (2006.01)
*B67D 3/04* (2006.01)

(52) U.S. Cl.
CPC ......... *B67D 3/0029* (2013.01); *B67D 3/0041* (2013.01); *B67D 3/045* (2013.01)

(58) Field of Classification Search
CPC ........... A47J 31/404; A24F 47/00; A21C 5/02

USPC ............... 222/545, 548, 549, 551, 553, 562
See application file for complete search history.

(56) References Cited

U.S. PATENT DOCUMENTS

| | | | | |
|---|---|---|---|---|
| 3,595,445 A * | 7/1971 | Buford | ............... | B65D 47/2025 222/213 |
| 9,448,095 B2 * | 9/2016 | Maher | ..................... | B65D 11/22 |
| 10,308,496 B2 * | 6/2019 | Nini | ....................... | B67D 3/044 |
| 2007/0290010 A1 * | 12/2007 | Nini | ....................... | B67D 3/044 222/511 |
| 2011/0174843 A1 * | 7/2011 | Rech | ................... | B05B 11/0059 222/376 |
| 2013/0341366 A1 * | 12/2013 | Campbell | ............... | F16K 31/52 222/505 |

* cited by examiner

*Primary Examiner* — Donnell A Long
(74) *Attorney, Agent, or Firm* — Barlow, Josephs & Holmes, Ltd.

(57) ABSTRACT

A dispensing system includes a liquid dispensing tap, an associated measuring cap/cup and a cap adapter or holder which is removably received onto the tap and which in turn removably receives the cap/cup. The dispensing tap, adapter/holder and cap/cup are configured such that the holder and cap/cup are assembled with the tap prior to installation onto a container, and stay assembled with the tap during installation onto the container at the filling line, and which can later be removed for use and then selectively reattached to the tap or container after use by the consumer.

20 Claims, 4 Drawing Sheets

DISPENSING SYSTEM INCLUDING A DISPENSING TAP AND AN INTEGRATED MEASURING CAP/CUP AND HOLDER

CROSS-REFERENCE TO RELATED APPLICATIONS

This application is a non-provisional filing of, and claims the benefit of U.S. Provisional Application No. 62/746,109, filed Oct. 16, 2019, the entire contents of which are incorporated herein by reference.

BACKGROUND OF THE DISCLOSURE

Embodiments of the invention relate to dispensing devices for flowable products such as liquid laundry detergent, and more particularly to a dispensing assembly including a liquid dispensing tap and an associated measuring cup which is assembled with the tap prior to installation onto a container, which stays assembled with the tap during installation onto the container at the filling line, and which can be removed and then optionally reattached to the tap or container after an initial use by the consumer.

Manufacturers and consumers continually drive the need for novel dispensing devices which provide easier assembly, more functionality and better dispensing options for a variety of products.

SUMMARY OF THE INVENTION

In order to simplify the process of filling liquid containers and assembling a tap and measuring cup/cap to the container on the filling line, the present disclosure provides for a combined dispensing tap and measuring cup where the measuring cup/cap is pre-assembled with the tap such that the combined tap/cap assembly can be installed onto the container in a single step.

The present disclosure is thus directed to a dispensing assembly comprising a combined dispensing tap and measuring cap/cup which is assembled with the tap prior to installation onto a container, which stays assembled with the tap during installation onto the container at the filling line, and which can be removed and then reattached to the tap or container after an initial use by the consumer.

An exemplary embodiment of the invention is in the form of a liquid laundry detergent dispensing system. Exemplary embodiments of the container include a neck or opening for connection of the tap. In some embodiments, the container neck may be threaded or alternately may be provided with a bayonet connection where the tap structure can be threaded or rotated into place.

The dispensing tap generally includes a body having a threaded skirt structure which is configured to be torqued (screwed) onto a corresponding threaded neck, or into an opening, on the liquid container. The tap further includes a dispensing head connected to the body by a throat. A fluid passage extends through the body, throat and dispensing head to provide a delivery path from the container to a mouth of the dispensing head. A valve assembly is guided within the dispensing head and controlled by a depressible actuator for selective dispensing of the liquid from the container. In some embodiments, the tap may include finger holds or a finger flange to provide leverage points to facilitate depression of the valve actuator.

The measuring cup/cap generally comprises a cup shaped structure having a bottom wall, sidewalls and an open top.

The exemplary embodiments may further include an annular adapter which is removably received onto the tap, and which in turn removably receives the cap. The adapter may include an inner ring which is configured and arranged to be seated around the skirt of the dispensing tap. The skirt and the inner ring may include complementary bayonet structures which allow for the adapter, having bayonet tabs, to be seated onto the skirt, having bayonet grooves. The adapter may be aligned and rotated clockwise to lock the adapter onto the dispensing tap. Alternately, the adapter my be press-fit directly onto the dispensing tap with the bayonet tabs being snap fit over the edges of the bayonet grooves on the skirt. The tab and groove bayonet structures provide major torque bearing surfaces which transfer external torque on the adapter to the dispensing tap when installed onto the container. In some embodiments, the inner ring of the adapter and the skirt may further include a plurality of circumferentially spaced ribs which engage to provide additional torque bearing surfaces.

The adapter may further include an outer ring having torqueing structures which interact with the cap for co-rotation. In some embodiments, the cap includes a plurality of elongated rib structures on the inner surface of the side walls which interact with complementary forward facing, spaced notches in the outer ring. When the cap is assembled with the adapter and dispensing tap, the ribs are seated within the notches and engage with the notches to provide torque points for co-rotation. Additionally, the cap and adapter include snap retention features which releasably maintain the cap assembled with the adapter. In some exemplary embodiments, the outer ring of the adapter includes circumferential grooves which receive complementary snap tabs formed on the inner surface of the peripheral upper edge of the side wall of the cap. When the open top of the measuring cup/cap is received over the dispensing tap and adapter the interfitting snap structures releasably hold the cup/cap to the adapter during installation onto the container and then selectively may be used to retain the cup for storage after customer initial use.

Additionally, the combined tap and cup structure, when assembled must also provide a sufficient gripping area to torque, i.e. grab and rotate the combined assembly onto the container. These above-described embodiments are generally gripped for assembly on the outer surface of the cup and the cup in turn grips the tap. The cup may have a cylindrical shape or may have an irregular shape which better conforms to the exterior shape of the tap and may provide an irregular external gripping surface for rotation of the assembly. The external surface of the cup may also include texturing or other raised or embossed surface features to provide additional engagement and surface area for higher torque during assembly.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

Figure 1:
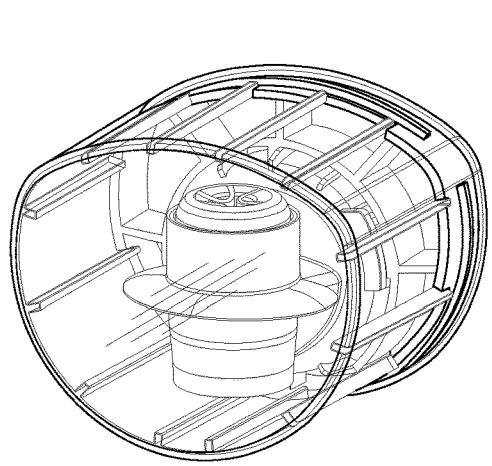
FIG. 1 is a perspective view of an exemplary dispensing assembly with the dispensing tap, adapter and cap assembled for installation onto a container.
Figure 2:
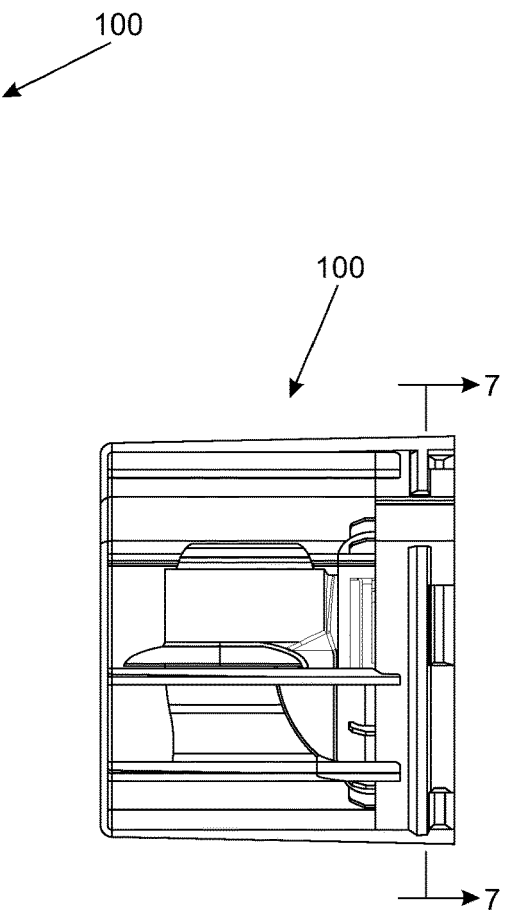
FIG. 2 is a side view thereof.
Figure 3:
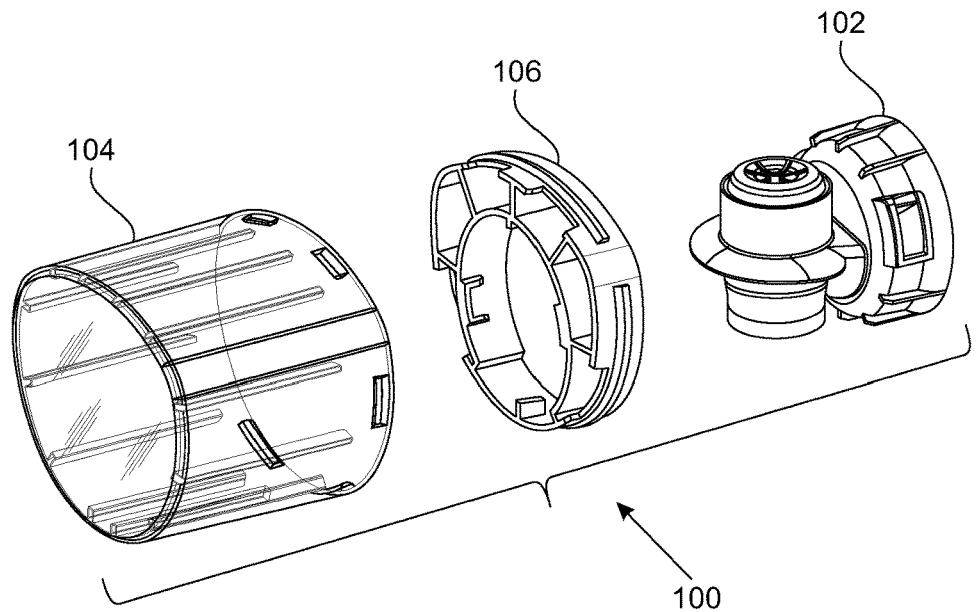
FIG. 3 is an exploded perspective view thereof.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

The present disclosure is generally directed to a novel dispensing assembly comprising a combined dispensing tap and measuring cap/cup which is assembled with the tap prior to installation onto a container, which stays assembled with the tap during installation onto the container at the filling line, and which can be removed and then reattached to the tap or container after an initial use by the consumer.

Referring now to FIGS. 1-9, an exemplary embodiment of the invention is in the form of a liquid laundry detergent dispensing system. Exemplary embodiments of a container (not shown) include a neck or opening for connection of a dispensing tap assembly 100. In some embodiments, the container neck may be threaded or alternately may be provided with a bayonet connection where the tap assembly 100 can be threaded or rotated into place.

The present dispensing tap assembly 100 includes a dispensing tap 102, a cup-shaped cap 104 and an adapter 106 bridging the connection between the tap 102 and the cap 104.

The dispensing tap 102 generally includes a body 108 having a threaded skirt structure 110 which is configured to be torqued (screwed) onto a corresponding threaded neck, or into an opening, on the liquid container. The tap 102 further includes a dispensing head 112 connected to the body 108 by a throat 114. A fluid passage extends through the body 108, throat 114 and dispensing head 112 to provide a delivery path from the container to a mouth of the dispensing head 112. A valve assembly 116 is guided within the dispensing head 112 and controlled by a depressible actuator for selective dispensing of the liquid from the container. In some embodiments, the tap 102 may include finger holds or a finger flange 118 to provide leverage points to facilitate depression of the valve actuator 116.

The measuring cup/cap 104 generally comprises a cup shaped structure having a bottom wall 120, sidewalls 122 and an open top.

Figure 4:
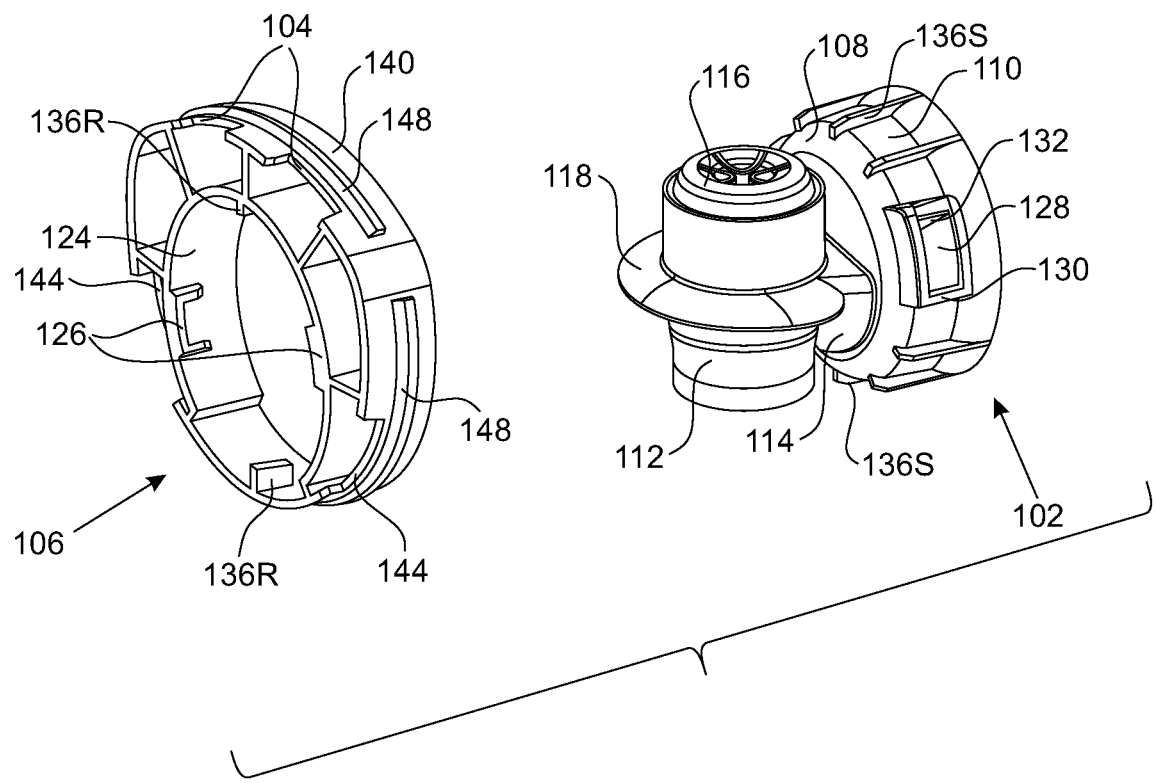
FIG. 4 is an exploded view of the adapter being assembled with the dispensing tap.
Figure 5:
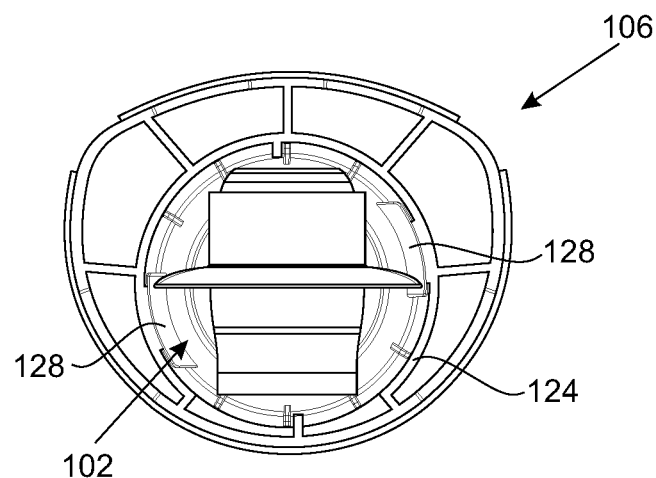
FIG. 5 is a front view thereof.
Figure 6:
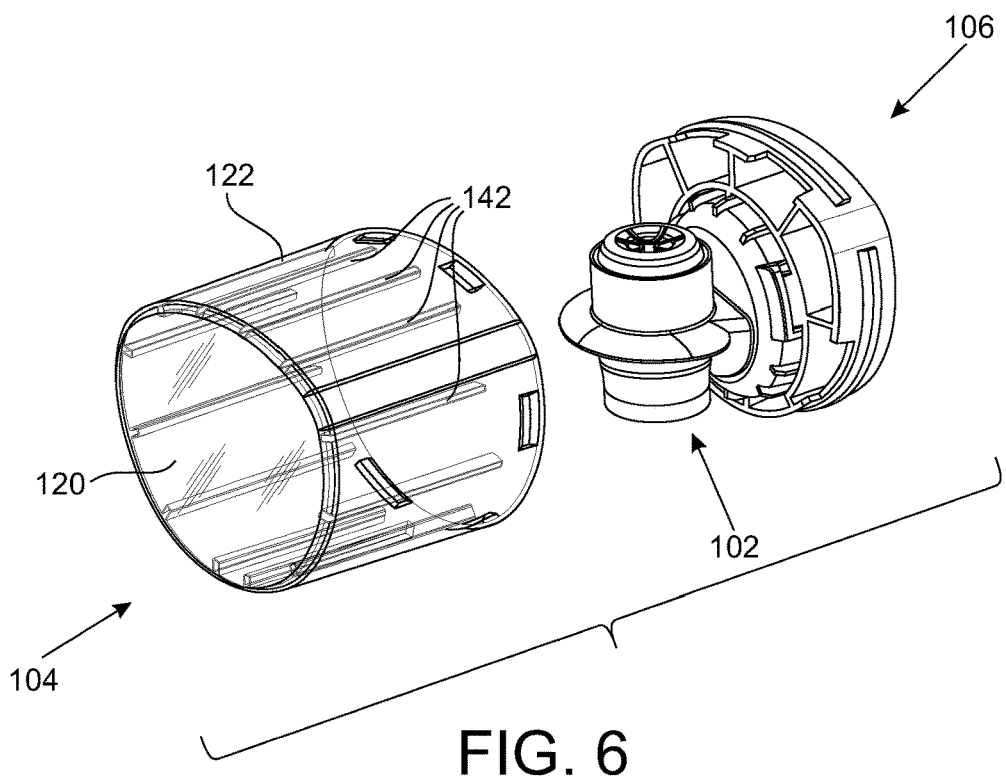
FIG. 6 is an exploded view of the cap being assembled with the adapter and tap.
Figure 7:
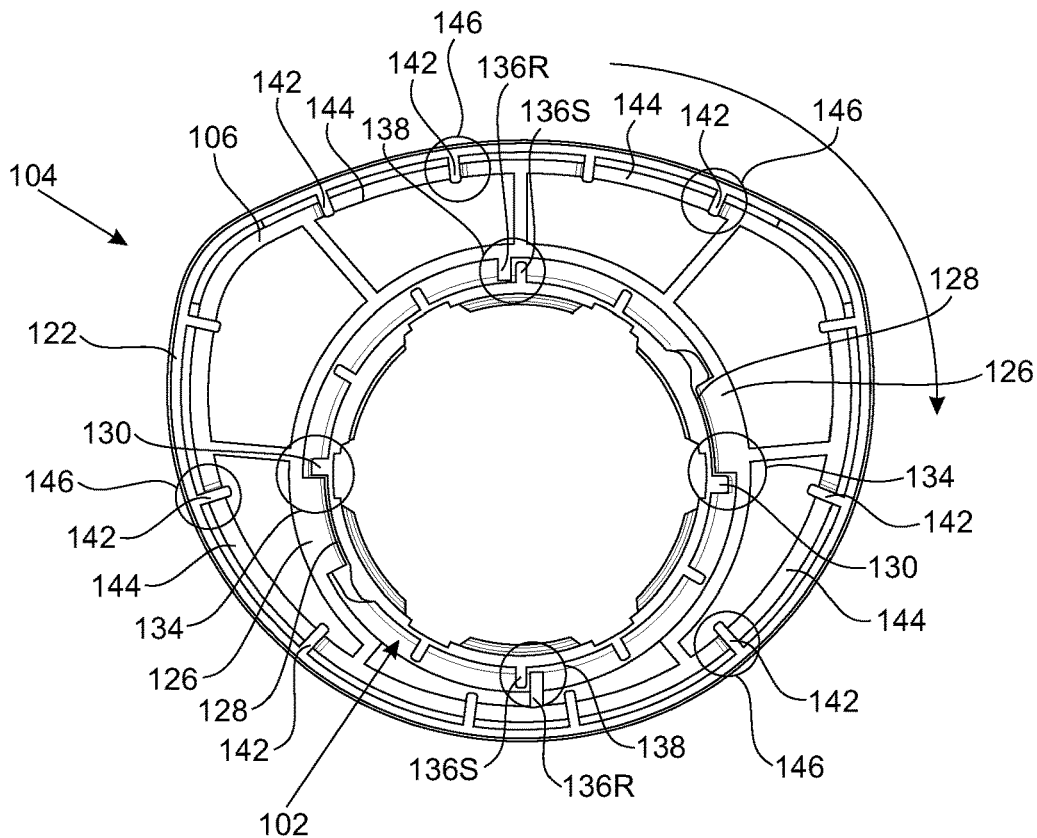
FIG. 7 is a cross-sectional view taken along line 7-7 of FIG. 2 illustrating the bearing points for torque applied to the assembly during installation onto a container.

The exemplary embodiments further include annular adapter 106 which is removably received onto the tap 102, and which in turn removably receives the cap 104. The adapter 106 may include an inner ring 124 which is configured and arranged to be seated around the skirt 110 of the dispensing tap 102. The skirt 110 and the inner ring 124 may include complementary bayonet structures which allow for the adapter 106 to be removably seated onto and secured to the skirt 110. In the illustrated embodiments, the inner ring 124 has bayonet tabs 126 while the skirt 110 has bayonet grooves 128. The adapter 106 may be aligned and rotated clockwise to lock the adapter 106 onto the dispensing tap 102. Alternately, the adapter 106 may be press-fit directly onto the dispensing tap 102 with the bayonet tabs 126 being snap fit over the edges of the bayonet grooves 128 on the skirt 110. The tabs 126 are captured in the groove 128 by a wall 130 at the clockwise end and a ramp 132 at the counterclockwise end. Referring to FIGS. 4, 5 and 7, the tab and groove bayonet structures 126, 128 provide major torque bearing surfaces (larger circles 134) which transfer external torque on the adapter 106 to the dispensing tap 102 when installed onto the container. In some embodiments, the inner ring 124 of the adapter 106 and the skirt 110 may further include a plurality of circumferentially spaced and aligned ribs 136A, 136S which engage to provide additional torque bearing surfaces (smaller circles 138).

The adapter 106 may further include an outer ring 140 having torqueing structures which interact with the cap 104 for co-rotation. In some embodiments, the cap 104 includes a plurality of elongated rib structures 142 on the inner surface of the sidewall 122 which interact with complementary forward facing, spaced notches 144 in the outer ring 140. When the cap 104 is assembled with the adapter 106 and dispensing tap 102 (FIGS. 1, 2, 7, 8), the ribs 142 are seated within the notches 144 and engage with the notches 144 to provide torque points (circles 146) for co-rotation. Additionally, the cap 104 and adapter 106 include snap retention features which releasably maintain the cap 104 assembled with the adapter 106. In some exemplary embodiments, the outer ring 140 of the adapter 106 includes circumferential grooves 148 which receive complementary snap tabs 150 formed on the inner surface of the peripheral upper edge of the sidewall 122 of the cap 104 (best seen in FIG. 6). When the open top of the measuring cup/cap 104 is received over the dispensing tap 102 and adapter 106, the interfitting snap structures 148, 150 releasably hold the cup/cap 104 to the adapter 106 during installation onto the container and then selectively may be used to retain the cup 104 for storage after customer initial use.

Additionally, the assembled tap 102, cup 104 and adapter 106 structures must provide a sufficient gripping area to torque, i.e. grab and rotate the combined assembly 100 onto the container. These above-described embodiments are generally gripped for assembly on the outer surface of the cup 104, the cup 104 in turn grips the adapter 106, which in turn grips the tap 102. The cup 104 may have a cylindrical shape or may have an irregular shape which better conforms to the exterior shape of the tap 102 and may provide an irregular external gripping surface for rotation of the assembly 100. The external surface of the cup 104 may also include texturing or other raised or embossed surface features to provide additional engagement and surface area for higher torque during assembly.

Referring back to FIG. 7, the assembly 100 provides the manufacturer the ability to assemble the dispensing tap 102, adapter 106 and cup 104 prior to installation onto the container. During installation, the entire assembly 100 is rotated clockwise onto the threaded neck of the container in one assembly step. The circles 134, 138, 138 identify all of the points for transfer of torque from the exterior of the cup 104 to the tap skirt 110.

Figure 8:
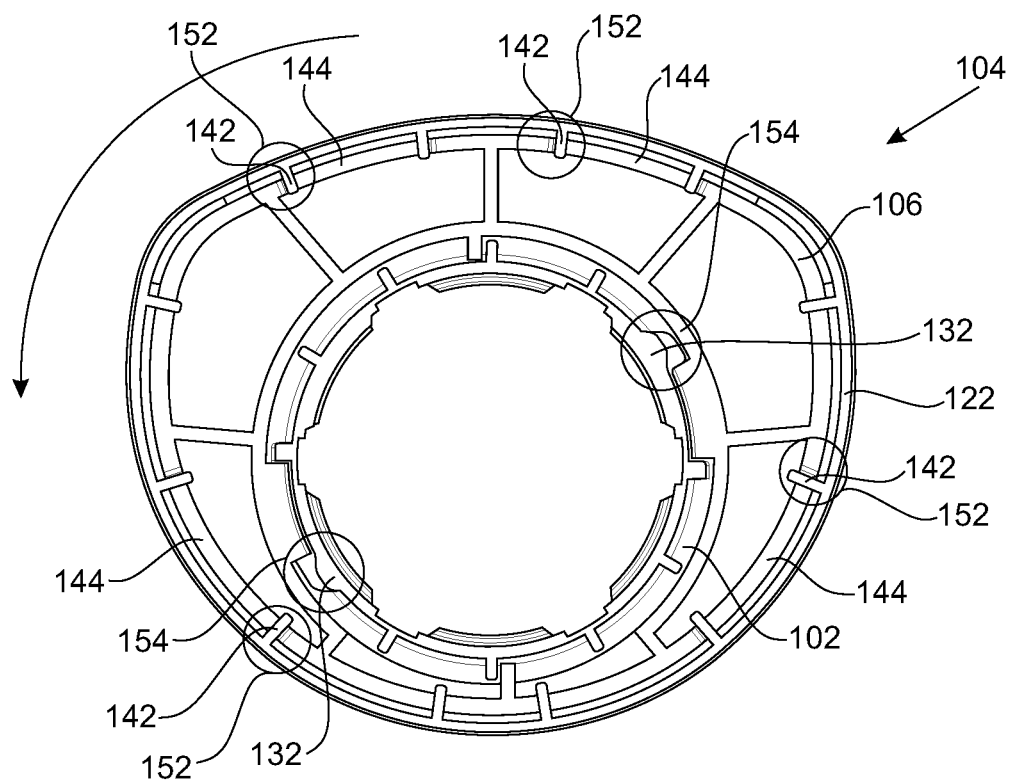
FIG. 8 is another cross-sectional view illustrating the bearing points for torque applied to the assembly during removal of the adapter and cap from the dispensing tap.
Figure 9:
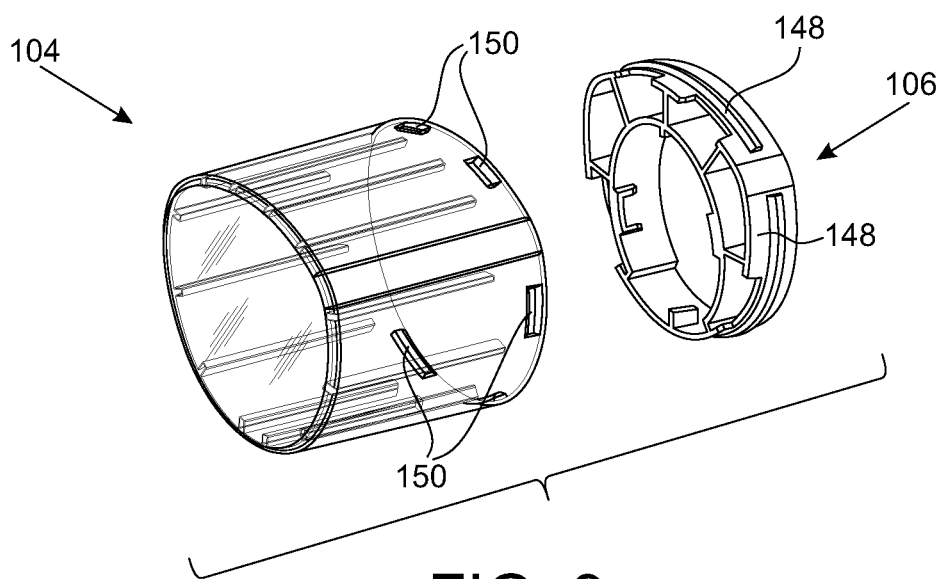
FIG. 9 illustrates removal of the adapter from the cap.

Referring to FIG. 8, it can be seen that the cup 104 and adapter 106 can later be removed by rotating the cup 104 counterclockwise. Circles 152 illustrate the torque points which transfer torque from the exterior of the cup to the adapter 106. Larger circles 154 identify the ramped surfaces 132 over which the adapter bayonet tabs 126 may slide for removal. Once the cap 104 and adapter 106 are removed from the tap 102, the adapter 106 may be removed from the cap 104 for use (See FIG. 9). The adapter 106 may be discarded or may be reassembled with the cap 104 and reattached to the tap 102 for storage.

It can therefore be seen that the present disclosure provides for a novel dispensing system where a liquid dispensing tap and an associated measuring cup are assembled prior to installation onto a container. In use, the cup stays assembled with the tap during installation onto the container at the filling line, and it can be later removed and then optionally reattached to the tap after an initial use by the consumer.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A dispensing system comprising:
 a dispensing tap including
  a body,
  a dispensing head, and
  a throat connecting the body to the dispensing head and providing a flow path from the body to the dispensing head;
 a cup-shaped cap having a bottom wall, side walls and an open top; and
 an adapter removably received on the tap, said cap removably received on the adapter,
 the tap and the adapter including interfitting structures which removably secure the adapter to the tap and allow the adapter and tap to rotate together,
 the adapter and the cap including interfitting structures which removably secure the cap to the adapter and allow the cap and adapter to rotate together.

2. The dispensing system of claim 1, wherein the tap body includes a skirt, and the skirt and the adapter include said interfitting formations to secure the adapter to the skirt of the tap body.

3. The dispensing system of claim 2, wherein the skirt and the adapter include rotatable bayonet structures to secure the adapter to the skirt of the tap body.

4. The dispensing system of claim 3, wherein an outer peripheral surface of the adapter and a peripheral lip of the cap include snap structures to secure the cap to the adapter.

5. The dispensing system of claim 2 wherein the skirt and the adapter include interfitting rib structures which allow the adapter and the tap to rotate together.

6. The dispensing system of claim 5, wherein an outer peripheral surface of the adapter and a peripheral lip of the cap include snap structures to secure the cap to the adapter.

7. The dispensing system of claim 2, wherein an outer peripheral surface of the adapter and a peripheral lip of the cap include snap structures to secure the cap to the adapter.

8. The dispensing system of claim 2 wherein the adapter and the side walls of the cap include interfitting rib structures which allow the cap and the adapter to rotate together.

9. The dispensing system of claim 1, wherein an outer peripheral surface of the adapter and a peripheral lip of the cap include snap structures to secure the cap to the adapter.

10. The dispensing system of claim 1 wherein the adapter and the side walls of the cap include interfitting rib structures which allow the cap and the adapter to rotate together.

11. The dispensing system of claim 1 wherein the tap and the adapter include interfitting rib structures which allow the adapter and the tap to rotate together.

12. The dispensing system of claim 11, wherein an outer peripheral surface of the adapter and a peripheral lip of the cap include snap structures to secure the cap to the adapter.

13. The dispensing system of claim 12 wherein the adapter and the side walls of the cap include interfitting rib structures which allow the cap and the adapter to rotate together.

14. The dispensing system of claim 11 wherein the adapter and the side walls of the cap include interfitting rib structures which allow the cap and the adapter to rotate together.

15. A dispensing system comprising:
 a dispensing tap including
  a body,
  a dispensing head, and
  a throat connecting the body to the dispensing head and providing a flow path from the body to the dispensing head;
 a cup-shaped cap having a bottom wall, side walls and an open top; and
 an adapter removably received on the tap, said cap removably received on the adapter,
 the tap and the adapter including interfitting structures which removably secure the adapter to the tap and allow the adapter and tap to rotate together,
 the adapter and the cap including interfitting rib structures which removably secure the cap to the adapter and allow the cap and adapter to rotate together.

16. The dispensing system of claim 15, wherein the tap body includes a skirt, and the skirt and the adapter include said interfitting formations to secure the adapter to the skirt of the tap body.

17. The dispensing system of claim 16, wherein the skirt and the adapter include rotatable bayonet structures to secure the adapter to the skirt of the tap body.

18. The dispensing system of claim 16 wherein the skirt and the adapter include interfitting rib structures which allow the adapter and the tap to rotate together.

19. The dispensing system of claim 15 wherein the skirt and the adapter include interfitting rib structures which allow the adapter and the tap to rotate together.

20. The dispensing system of claim 15, wherein an outer peripheral surface of the adapter and a peripheral lip of the cap include snap structures to secure the cap to the adapter.

* * * * *